(12) United States Patent
Tani et al.

(10) Patent No.: US 6,199,646 B1
(45) Date of Patent: Mar. 13, 2001

(54) WORKING VEHICLE WITH SEMICRAWLERS

(75) Inventors: Yoshifumi Tani; Ryoji Kuriki, both of Asahikawa; Katsushi Fukawatase, Sakai; Masayuki Sato, Sakai; Seiichi Takahashi, Sakai; Kenichiro Tsuji, Sakai, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 08/902,806

(22) Filed: Jul. 30, 1997

(30) Foreign Application Priority Data

Aug. 1, 1996 (JP) .................................................. 8-203920
Aug. 1, 1996 (JP) .................................................. 8-203921
Aug. 1, 1996 (JP) .................................................. 8-203922

(51) Int. Cl.[7] .................................................. B62D 55/00
(52) U.S. Cl. .................................................. 180/9.21; 180/9.5
(58) Field of Search .................................. 180/92.1, 9.26, 180/9.28, 9.3, 9.5, 9.6

(56) References Cited

U.S. PATENT DOCUMENTS

| | | | |
|---|---|---|---|
| 2,467,947 | * 4/1949 | Skelton | 180/9.21 |
| 3,682,266 | * 8/1972 | Stoliker | 180/9.62 |
| 3,689,123 | * 9/1972 | Barbieri | 180/9.5 |
| 3,737,001 | * 6/1973 | Rasenberger | 180/8.21 |
| 3,828,873 | * 8/1974 | Oestmann | 180/9.5 |
| 3,863,726 | * 2/1975 | O'Brien et al. | 180/9.5 |
| 3,869,010 | * 3/1975 | Stedman | 180/9.5 |
| 3,938,606 | * 2/1976 | Yancey | 180/9.5 |
| 3,939,930 | * 2/1976 | Firstenberg | 180/9.5 |
| 4,208,923 | * 6/1980 | Ikegami | 74/15.63 |
| 4,273,206 | * 6/1981 | Van Der Lely | 180/9.21 |
| 4,313,516 | * 2/1982 | Terry | 180/185 |
| 4,364,443 | * 12/1982 | Sato et al. | 180/9.5 |
| 4,560,018 | * 12/1985 | Satzler | 180/9.1 |
| 4,706,769 | * 11/1987 | Latourelle et al. | 180/9.21 |
| 4,824,128 | * 4/1989 | Takagi et al. | 180/53.1 |
| 4,865,141 | * 9/1989 | Gey | 180/9.26 |
| 4,895,217 | * 1/1990 | Hueckler et al. | 180/233 |
| 4,949,800 | * 8/1990 | Virly | 180/9.21 |
| 5,273,126 | 12/1993 | Reed et al. | 180/9.21 |
| 5,343,960 | * 9/1994 | Gilbert | 172/823 |
| 5,358,064 | * 10/1994 | Oertley | 180/9.5 |
| 5,361,860 | * 11/1994 | Smith et al. | 180/9.21 |
| 5,388,656 | * 2/1995 | Lagasse | 180/9.21 |
| 5,492,194 | * 2/1996 | McGinn et al. | 180/233 |
| 5,517,416 | * 5/1996 | Torii et al. | 364/424.07 |
| 5,566,773 | * 10/1996 | Gersmann | 180/9.5 |

FOREIGN PATENT DOCUMENTS

| | | | |
|---|---|---|---|
| 925032 | * 5/1963 | (GB) . | |
| 63-70488 | 5/1988 | (JP) . | |
| 65974 | 5/1988 | (JP) . | |
| 4257778 | 9/1992 | (JP) . | |

* cited by examiner

*Primary Examiner*—Kevin Hurley
*Assistant Examiner*—Andrew J. Fischer
(74) *Attorney, Agent, or Firm*—Webb Ziesenheim Logsdon Orkin & Hanson, P.C.

(57) ABSTRACT

A tractor includes a body frame (4), front wheels (3), propelling shafts (8) disposed in a rear portion of the body frame, and semicrawler units (10) for receiving drive from the propelling drive shafts. Each semicrawler unit includes a drive rolling element (11) attachable to one of the propelling drive shafts, an endless crawler track (15) driven by the drive rolling element and contacting the ground, driven rolling elements (13, 14) engaged by the endless crawler track, and a track frame (12) for supporting the driven rolling elements. The track frame is supported by the body frame to be vertically oscillatable through a pivot shaft (16). Rear wheels (9) may be attached in place of the semicrawler units to the propelling drive shafts.

18 Claims, 14 Drawing Sheets

WORKING VEHICLE WITH SEMICRAWLERS

BACKGROUND OF THE INVENTION

1. Field of the Invention

This invention relates to a working vehicle having a body frame, front wheels, propelling drive shafts mounted in a rear portion of the body frame, and semicrawler units driven by the propelling drive shafts.

2. Description of the Related Art

Such a working vehicle has high utility; it has a wide range of use including operations in paddy fields and other farming fields and on dairy farms. Working vehicles, particularly agricultural working vehicles, may be classified by the running device broadly into the wheel type and crawler type. The wheel type having two axles and four wheels may be subdivided into the four wheel drive type, rear wheel drive type and front wheel drive type. The crawler type may be subdivided into the full crawler type and semicrawler type. (See Agricultural Machine Handbook, New Edition, pages 257–259).

The wheel type working vehicle equipped with a three-point linkage, a PTO shaft and hydraulic control devices may be used in a wide range of operations including plowing, sowing, tilling, weeding, harvesting and transport. This type of working vehicle is used as a power vehicle in all seasons and is a mainstream of agricultural automation.

The full crawler type working vehicle has a large ground-engaging area, and therefore has a smaller ground contact pressure than the wheel type working vehicle. Thus, the full crawler vehicle can run on soft or unleveled grounds. This type of vehicle, with a heavy weight and a large adhesion coefficient, is suited for a heavy operation requiring a strong tractive force. This type of vehicle is a seasonal dedicated vehicle used exclusively in land development or land improvement. Such an operation is impossible with a wheel type working vehicle, and requires a sub-soiler to secure drainage in wet fields, for example.

The semicrawler type working vehicle has belt units in place of rear wheels to act as an apparatus supplemental to the wheel type working vehicle. On soft grounds, the semicrawler working vehicle exhibits a performance intermediate between the wheel type and the full crawler type.

The wheel type working vehicle is highly mobile to be suitable for a wide range of operations. Its disadvantage is that the running performance is low unless the fields become dry in plowing times, e.g. under changeable weather of autumn and the influence of snow in early spring (the latter being called spring plowing practiced substantially during a fixed period in spring in view of the growth and harvest of crops).

In such a situation, i.e. under unfavorable conditions or in very wet fields, the full crawler working vehicle demonstrates an excellent performance. However, this vehicle, which lacks in mobility and is a specialized machine applicable only to a limited operation. When used in a harvesting operation in a dry field, the vehicle would damage the field. After all, both the wheeled working vehicle and the full crawler working vehicle must be made available. This requires a huge investment in agricultural management.

Under such circumstances, semicrawler working vehicles have been proposed as disclosed in Japanese Patent Laying-Open Publication H4-257778 (hereinafter called conventional example 1), and in Japanese Utility Model Publication H6-5974 and Utility Model Laying-Open Publication S63-70488 (hereinafter called conventional example 2).

Conventional example 1 includes rollers disposed rearwardly of the rear wheels, and crawler belts (endless tracks) wound around the rear wheels and rollers. The running devices (rollers) project to a large extent rearwardly of the vehicle body to be obstructive to a working implement using a three-point linkage. Further, the vehicle has an excessively large wheelbase to impair turning performance. A high operating quality cannot be expected when running on unleveled grounds or the like.

Conventional example 2 includes oscillatable semi-crawler units to have some adaptability to operations in rugged fields, for example. However, this example is applied to a specialized machine such as a combine harvester. This working vehicle cannot be used in varied operations without changing its construction for attaching the semicrawler units to the vehicle body.

SUMMARY OF THE INVENTION

The object of this invention is to provide a working vehicle which is essentially a front wheel type vehicle to which semicrawler units may be attached without changing its basic body structure.

The above object is fulfilled, according to this invention, by a working vehicle comprising semicrawler units each including a drive rolling element attached to one of the propelling drive shafts, an endless crawler track driven by the drive rolling element and contacting the ground, driven rolling elements engaged by the endless crawler track, and a track frame for supporting the driven rolling elements, the track frame being supported by the body frame to be vertically oscillatable through a pivot shaft.

With this construction, the track frame supporting the driven rolling elements is supported by the body frame to be vertically oscillatable through a pivot shaft. Thus, the vehicle can run steadily even on rugged grounds.

In a preferred embodiment of this invention, each semi-crawler unit further includes a stopper for limiting vertical oscillation of the track frame to a predetermined oscillating angle. This provision prevents a deterioration in running performance due to an excessive oscillation of the track frame. Preferably, the stopper may be set to equalize an upward permissible oscillating angle and a downward permissible oscillating angle from a horizontal reference position of the track frame, or to provide an upward permissible oscillating angle larger than a downward permissible oscillating angle from the horizontal reference position of the track frame. Where the vehicle body is not suited for directly attaching the smeicrawler units, the track frames may be oscillatably supported by the body frame through a rectangular mounting frame fixed to the body frame and including the pivot shafts. This feature allows the semicrawler units to be attached to varied front wheel type working vehicles without changing the basic vehicle structures.

Preferably, the pivot shafts are disposed at a lower level above the ground than the propelling drive shafts. Then, the semicrawler units have a reduced amplitude of oscillation to allow the working vehicle to run steadily while suppressing pitching thereof.

It will also be advantageous if the endless crawler track has a ground contacting length divided by a vertical line passing through an axis of the drive rolling element, into a longer forward portion and a shorter rearward portion. This secures a sufficient ground engaging length without increasing an overall length of the working vehicle. In addition, a space may be secured with ease for connecting a working implement to an attaching device such as a three-point linkage disposed rearwardly of the vehicle body.

The driven rolling elements may be distributed to a forward end and a rearward end of the track frame to produce a linear ground-engaging portion of the endless crawler track. Then, the endless crawler track includes a forwardly and downwardly inclined portion extending from the drive rolling element to one of the driven rolling elements disposed at the forward end. Boarding steps may provided above the inclined portion of the endless crawler track. The inclined portion may serve as a boarding step for the driver.

In the working vehicle according to this invention, rear wheels may be interchangeable with the semicrawler units for attachment to the propelling drive shafts. This feature provides the following advantages.

When a wheel type vehicle has difficulties in plowing fields under changeable weather of autumn or the influence of snow in early spring, the right and left rear wheels may be replaced with the right and left semicrawler units. Then the vehicle can engage in a plowing operation with sufficient running performance. The semicrawler type vehicle has a lower ground contact pressure and imparts a stronger tractive force than the wheel type. Besides, the semicrawler vehicle can carry out an operation along contour lines without sideways skidding on an inclined terrain.

When mobility is required as in a weeding or harvesting operation in dry fields, the semicrawler units may be replaced with rear wheels. In this way, the working vehicle may be used to suit different working conditions and working modes. The rear wheels and semicrawler units interchangeable for use with a single working vehicle alleviate the burden on agricultural management.

Other features and advantages of this invention will be apparent from the following description of embodiments to be taken in conjunction with the accompanying drawings.

DESCRIPTION OF THE PREFERRED EMBODIMENTS

Embodiments of this invention will be described hereinafter with reference to the drawings.

Figure 1:
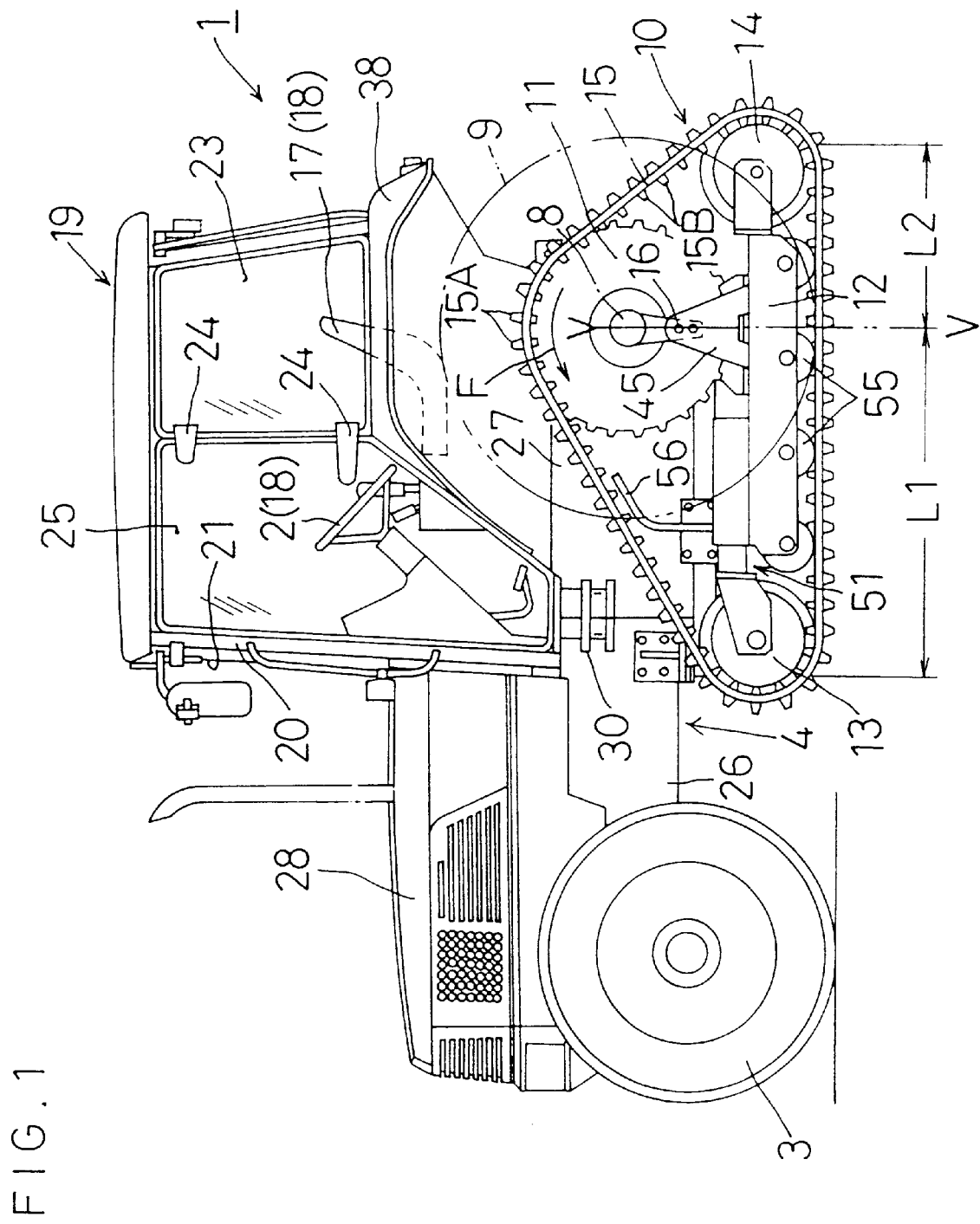
FIG. 1 is a side elevation of a semicrawler tractor according to this invention.
Figure 2:
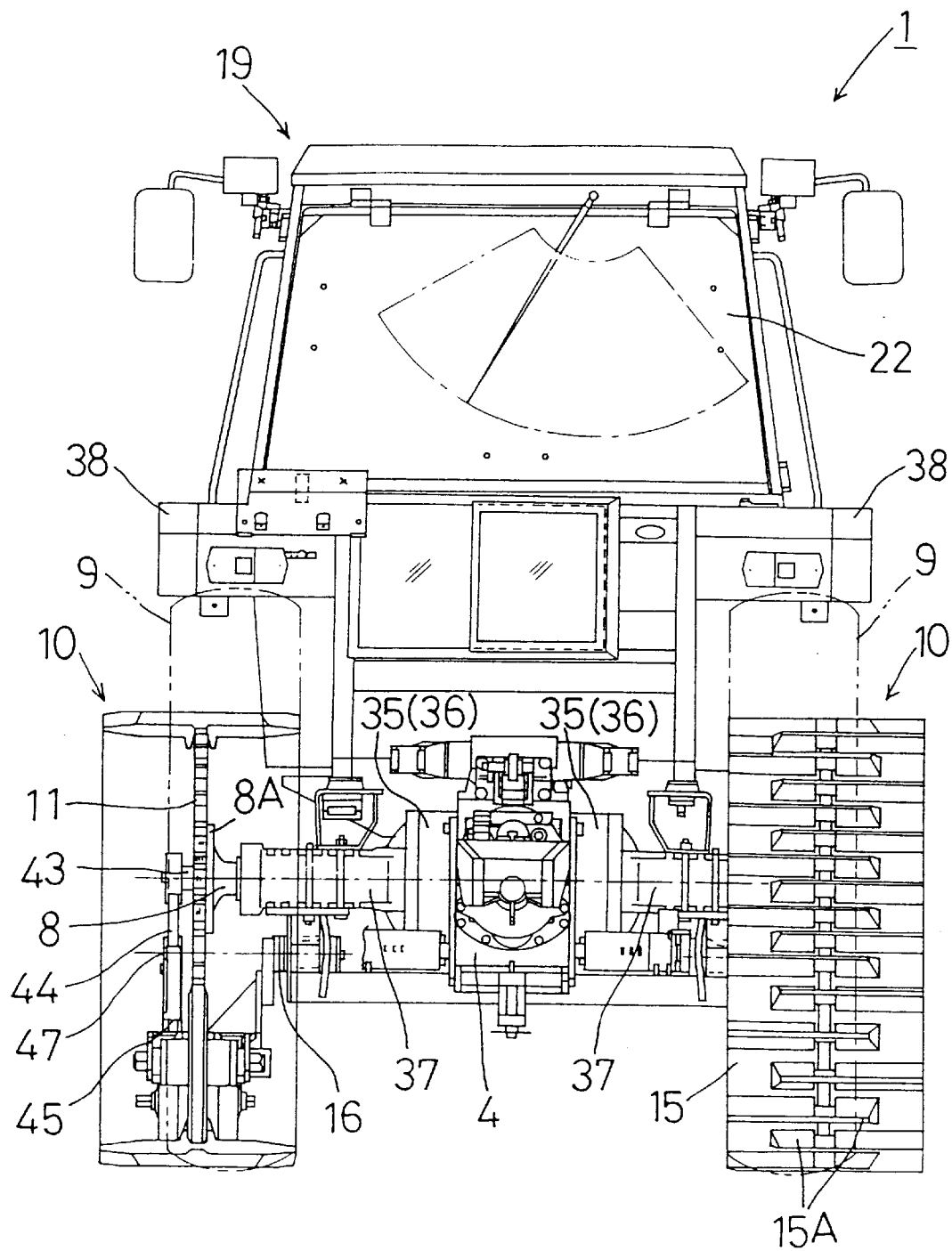
FIG. 2 is a rear view of the semicrawler tractor.
Figure 3:
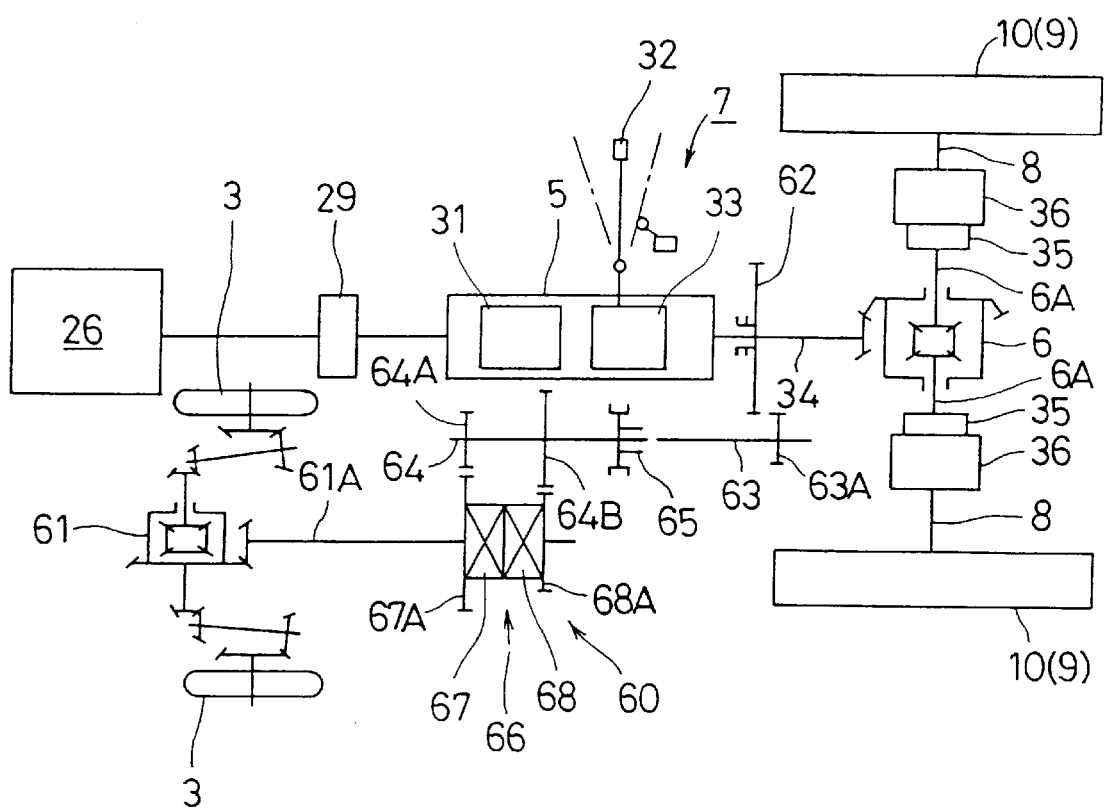
FIG. 3 is a schematic view of a propelling transmission system.

FIG. 1 shows a side elevation of a tractor 1 which is one example of working vehicles according to this invention and which is equipped with semicrawler units in place of rear wheels. FIG. 2 shows a rear view thereof. FIG. 3 shows a propelling transmission system. The tractor 1 includes a steering wheel 2 for controlling dirigible right and left front wheels 3. A tractor body 4 includes a change speed device 5 and a rear differential 6 constituting a rear wheel propelling transmission system 7 for outputting a plurality of traveling speeds. The propelling transmission system 7 drives a pair of right and left rear axles 8 acting as propelling drive shafts. Right and left rear wheels 9 and right and left semicrawler units 10 are interchangeably attached to the rear axles 8.

Each of the right and left semicrawler units 10 includes a drive rolling element 11 attached to an end of the rear axle 8, front and rear driven rolling elements 13 and 14 supported by a track frame 12, and an endless crawler track 15 wound around the drive rolling element 11 and front and rear driven rolling elements 13 and 14. The track frame 12 is supported by the tractor body 4 to be vertically oscillatable through a pivot shaft 16. A driver's seat 17 is disposed rearwardly of the steering wheel 2, which in combination provide a steering control device 18. The steering control device 18 is enclosed in a cab 19 mounted on the tractor body 4.

The cab 19 includes a box-shaped framework 20, a front glass element 21 filling an entire front area of the framework 20, a rear glass element 22 disposed in a rear face of the framework 20, side glass elements 23 disposed in the framework 20 at the right and left sides of the driver's seat 17, and right and left doors 25 disposed forwardly of the side glass elements 23 to be opened and shut about vertical axes through hinges 24. The doors 25, in combination with boarding steps 30, substantially form part of a boarding device leading to the steering control device 18.

The tractor body 4 includes, as main components thereof, an engine 26, and a transmission case 27 formed integral with a rear surface of the engine 26. The engine 26 is covered by a hood 28. The transmission case 27 contains a main clutch element 29, the propelling transmission system 7 for receiving engine power through the main clutch element 29, and a PTO transmission system not shown.

The propelling change speed device 5 includes a main change speed device 31 for outputting a plurality of traveling speeds, an auxiliary change speed device 33 operable by a lever 32 to output a high and a low traveling speeds, and a shuttle change speed device and a creep change speed device not shown. The propelling change speed device 5 is interlocked to the rear differential 6 through a differential drive shaft 34 in the form of a bevel pinion shaft.

The rear differential 6 has right and left output shafts 6A interlocked to the right and left rear axles 8 through brakes 35 and reduction devices 36. As shown in FIG. 2, the rear axles 8 are supported in rear axle cases 37, respectively. The rear axle cases 37 also support right and left rear wheel fenders 38 and rear portions of the cab 19.

As shown in FIGS. 4 through 7, each semicrawler unit 10 is attached to the tractor body 4 through a mounting frame 39. The mounting frame 39 is shaped square in plan view and attached to a lower surface of the tractor body 4.

The mounting frame 39 includes right and left front mounting elements 40 detachably attached to right and left vertical surfaces of the tractor body 4 by bolts or the like, and right and left rear mounting elements 41 attached to lower surfaces of the rear axle cases 37 projecting from the tractor body 4 by bolts or the like. The mounting frame 39 is bolted to a lower portion of the tractor body 4 through these front and rear mounting elements 40 and 41.

Thus, the semicrawler units 10 are supported by the tractor body 4 not directly but through the mounting frame 39. This construction is employed since the transmission case 27 and other components constituting the tractor body 4 are usually formed by casting and it is difficult to attach the semicrawler units 10 directly thereto.

The rear mounting elements 41 of the mounting frame 39 have the pivot shafts 16 extending transversely of the tractor body 4, respectively. Each track frame 12 has a bearing cylinder 42 for rotatably receiving the right or left pivot shaft 16. The pivot shaft 16 and bearing cylinder 42 allow the track frame 12 of each semicrawler unit 10 to oscillate relative to the tractor body 4 through the mounting frame 39.

Since it is sufficient to support each semicrawler unit 10 to be oscillatable relative to the tractor body 4, the pivot shaft 16 may be disposed on the track frame 12 and the bearing cylinder 42 on the tractor body 4.

Further, the pivot shaft 16 may be disposed in any desired position as long as it extends parallel to the rear axle 8. In this embodiment, as shown in FIG. 1, the pivot shaft 16 is located in a lower position on a vertical line V—V passing through the axis of rear axle 8. Thus, with the pivot shaft 16 disposed close to the ground, a reduced oscillating amplitude occurs when the tractor runs in a rugged field, for example, thereby effectively suppressing pitching.

Figure 10:
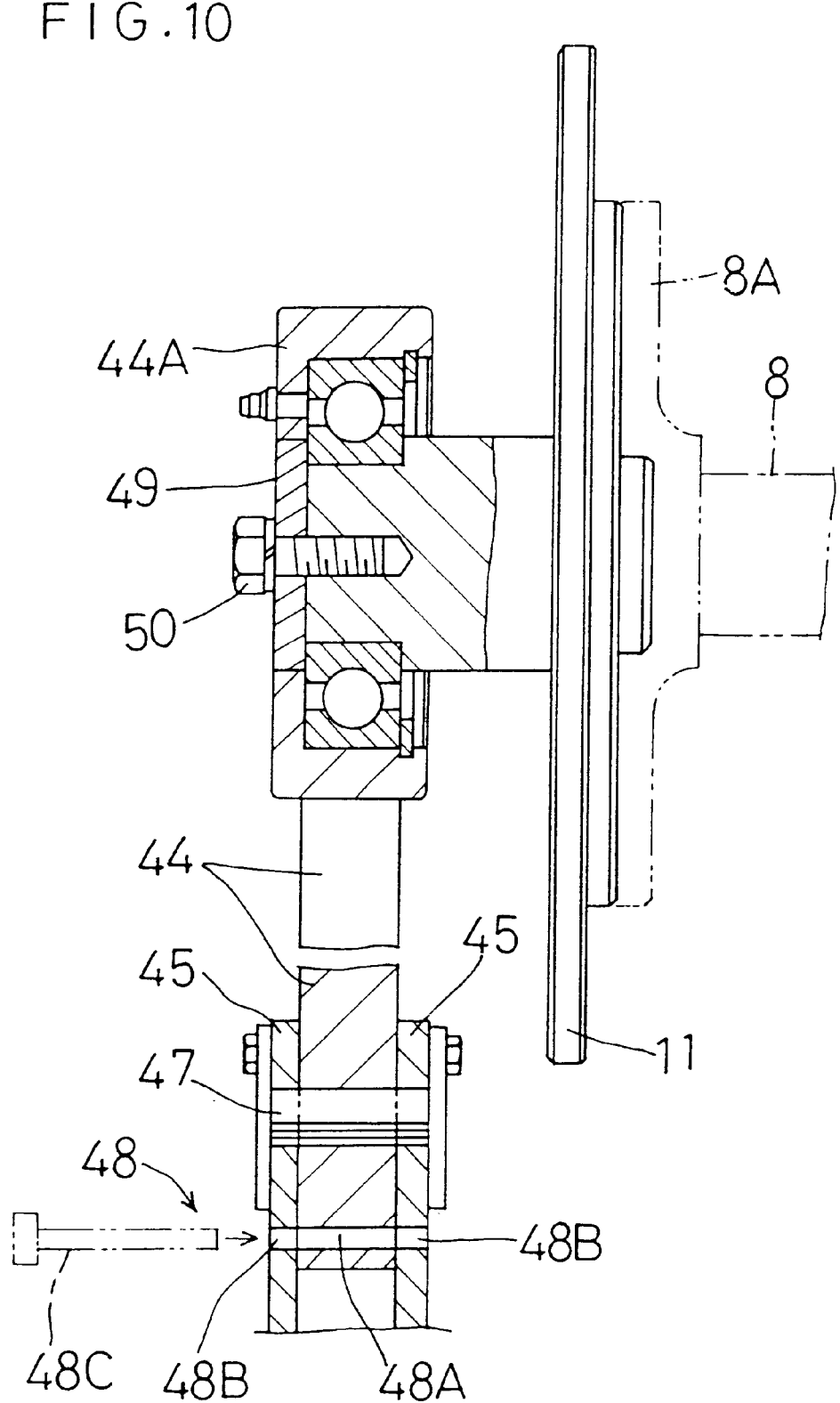
FIG. 10 is an enlarged sectional view of a pivot shaft.

The drive rolling element 11 of each semicrawler unit 10 may be selected from the drum type, roller type and sprocket type. It is the sprocket type in the example shown in the drawings. As shown in FIG. 10, the drive rolling element 11 is secured to an end flange 8A of the rear axle 8 by a plurality of bolts.

The drive rolling element 11 has a support shaft 43 formed integral therewith and projecting axially outwardly thereof. The support shaft 43 has an outward end thereof fitted in a bearing portion 44A of a support arm 44. The support arm 44 is supported in a lower position thereof through a different pivot shaft 47 by a bracket 45 projecting from the track frame 12.

The different pivot shaft 47 is disposed on an extension line from the axis of the pivot shaft 16. Thus, the track frame 12 is supported by the coaxial pivot shafts 16 and 47 opposed to each other across the drive rolling element 11, thereby reliably preventing sidewise rolling.

The support arm 44 has a lock device 48 for supporting the drive rolling element 11 and locking it against oscillation relative to the track frame 12. The lock device 48 includes a lock bore 48A formed in the support arm 44, a receiving bore 48B formed in the bracket 45, and a lock pin 48C movable into and out of the two bores 48A and 48B when the latter are in register. In the illustrated example, the lock device 48 is disposed below the pivot shaft 47. However, the lock device 48 may be disposed above the pivot shaft 47. A plurality of lock bores 48A and a plurality of receiving bores 48B may be formed to receive a plurality of lock pins 48C. The lock pin may be in the form of a bolt and nut.

When mounting each semicrawler unit 10 on the rear axle 8, the drive rolling element 11 is attached to the rear axle 8, with the lock device 48 used to prevent oscillation and facilitate positioning of the pivot shaft 16. After semicrawler unit 10 is mounted in place, the lock device 48 is unlocked to allow oscillation. Numeral 49 in FIG. 10 denotes a retainer collar fitted on the bearing portion 44A and secured to an end surface of the support shaft 43 by a bolt 50. The bearing portion 44A is shown to be in the form of a ball bearing, but may be a different type of bearing such as a pillow block bearing.

Figure 8:
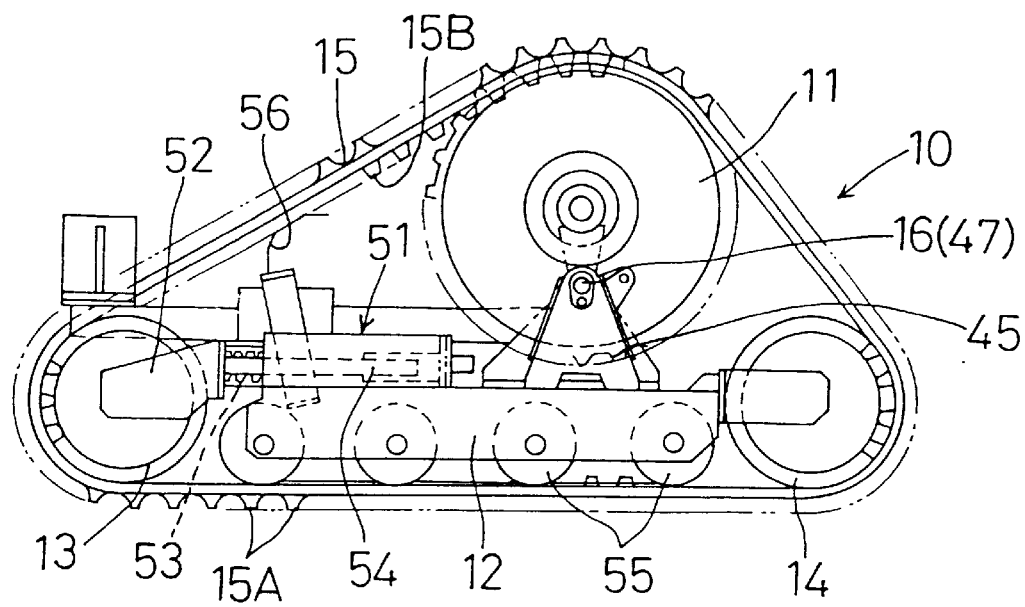
FIG. 8 is a side view of a semicrawler.

As shown in FIGS. 1 and 8, each of the right and left semicrawler units 10 mounted on the rear axles 8 has a triangular shape in side view. Each semicrawler unit 10 defines different ground-engaging lengths L1 and L2 forwardly and rearwardly of the vertical line V—V passing through the axis of the rear axle 8. The forward ground-engaging length L1 is larger than the rearward ground-engaging length L2. Thus, the semicrawler unit 10 projects only to a limited extent rearwardly of the tractor body 4. This facilitates connection of a working implement (e.g. a rotary plow, sub-soiler or broadcaster) to an attaching device such as a three-point linkage disposed in the rear of tractor body 4. At the same time, a sufficient ground-engaging length is secured to prevent sidewise skidding on inclined grounds and to assure a strong tractive force.

The endless crawler track 15 of each of the right and left semicrawler units 10 is an elastic crawler (e.g. a rubber crawler) having ground-engaging lugs 15A arranged on an outer circumference thereof, and guide projections 15B arranged on an inner circumference thereof. The endless crawler track 15 has a forwardly and downwardly inclined portion extending from the drive rolling element 11 to the front driven rolling element 13. The front driven rolling element 13 is located adjacent the boarding steps 30.

With this construction, the endless crawler track 15 may be used as an auxiliary boarding step, without presenting an obstacle to opening and shutting the door 25 about the hinges 24. This tractor 1, though the semicrawler type, has substantially the same wheelbase (i.e. distance between front wheels 3 and rear wheels 9) as a wheel type tractor to be capable of making small, sharp turns.

As shown in FIG. 1, the tractor 1 travels forward when the drive rolling element 11 is driven in the direction of arrow F, and travels backward when the drive rolling element 11 is driven in the direction opposite to arrow F. The portion of endless crawler track 15 extending between the drive rolling element 11 and front driven rolling element 13 tends to become slack in time of forward running. A tension adjusting device 51 acts on the front driven rolling element 13 to adjust a slackness resulting from oscillation of the track frame 12.

As shown in FIG. 8, the tension adjusting device 51 is mounted on the track frame 12 in the form of a biasing mechanism. The tension adjusting device 51 includes a coil spring 53 and a tension cylinder 54 for pressing a support fork 52 of the front driven rolling element 13 against the endless crawler track 15.

Each track frame 12 has a plurality of (four in FIG. 8) guide wheels 55 arranged therein. A guide device (crawler support) 56 is provided for contacting the inner circumferential surface of endless crawler track 15 extending from the drive rolling element 11 to the front driven rolling element 13 to prevent slackening of the endless crawler track 15.

Figure 7:
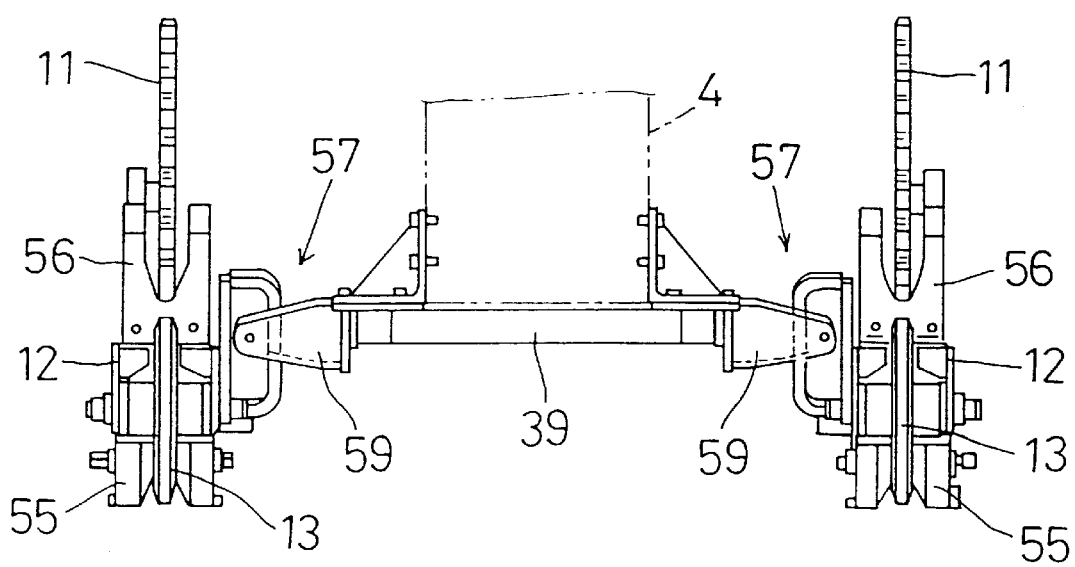
FIG. 7 is a view seen in a direction indicated by arrows B—B of FIG. 5.

The guide device 56 is removably mounted on the tension cylinder 54. As shown in FIG. 7, the guide device 56 has a bifurcate guide 56A formed at a distal end thereof. The guide device 56 is formed of an elastic band such as SS330.

Each of the right and left semicrawler units 10 has the track frame 12 vertically oscillatable about the pivot shaft 16. This absorbs pitching of the tractor body 4 when running in a rugged field, on an unleveled ground or on a snowbound road. A range of vertical oscillation of each track frame 12 is limited by an oscillation limiting stopper 57.

Figure 4:
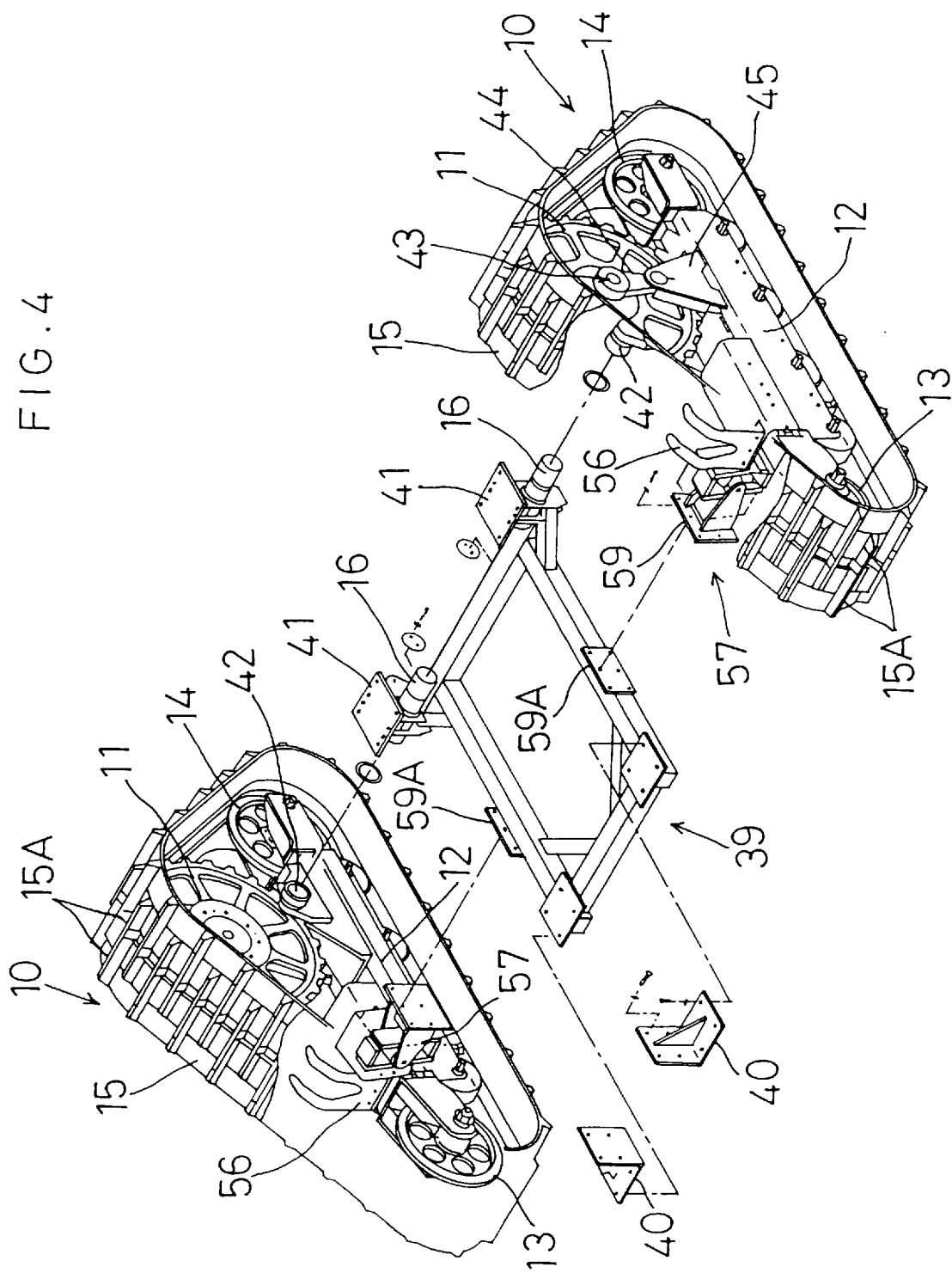
FIG. 4 is an exploded perspective view of right and left semicrawlers.
Figure 5:
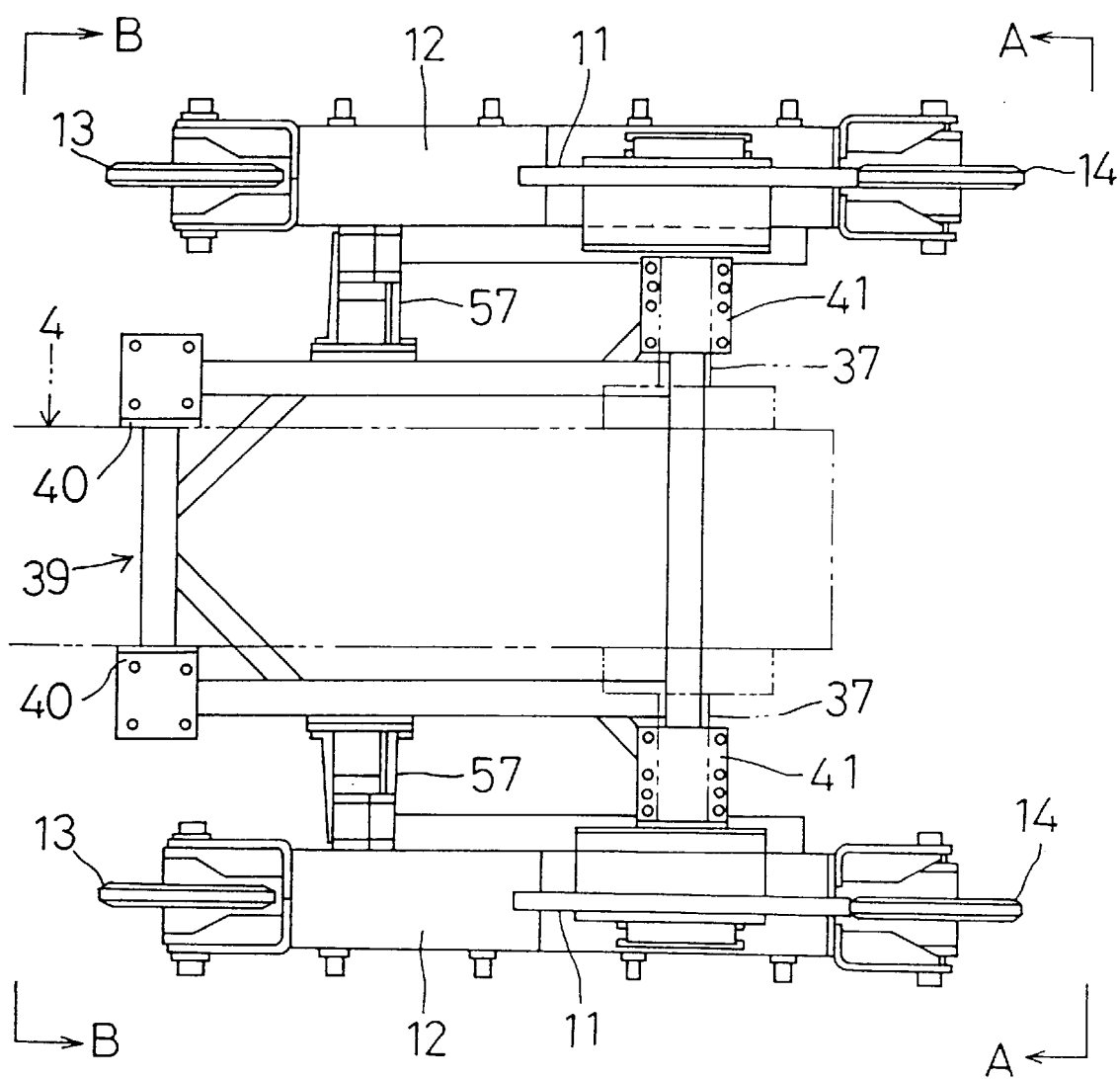
FIG. 5 is a plan view of the right and left semicrawlers.
Figure 6:
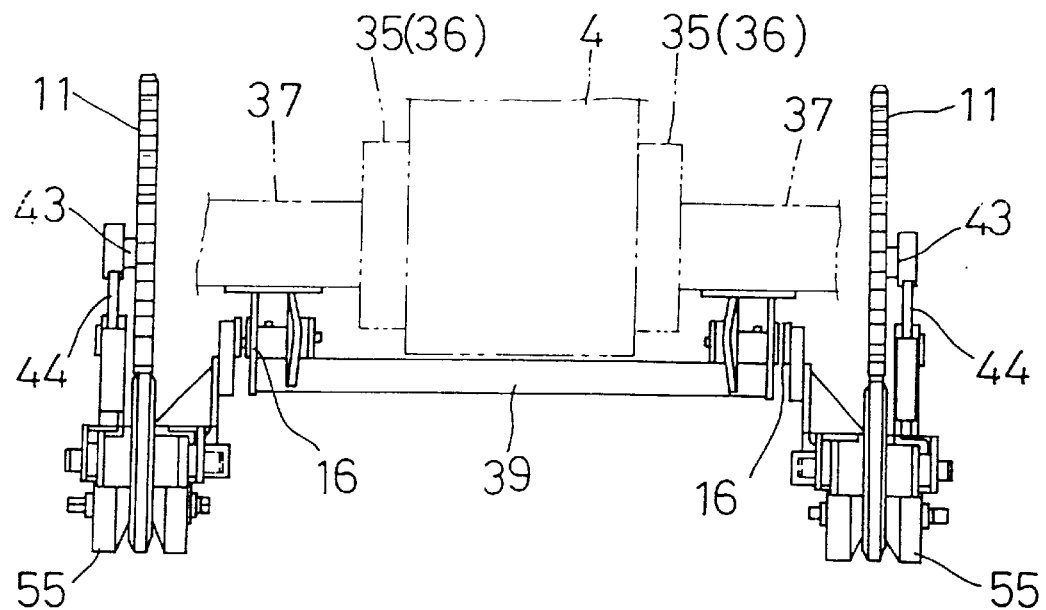
FIG. 6 is a view seen in a direction indicated by arrows A—A of FIG. 5.
Figure 9:
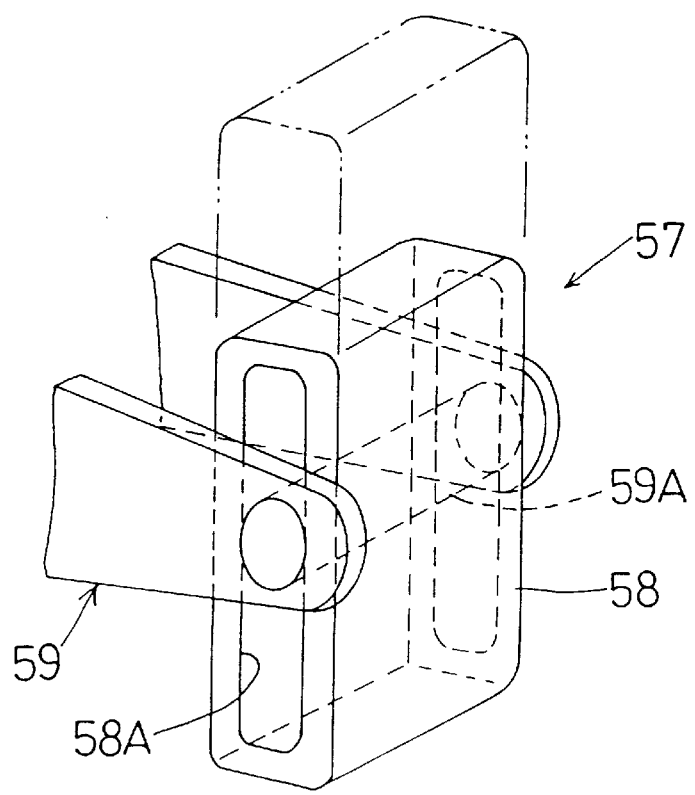
FIG. 9 is a perspective view of an oscillation limiting device.

As shown in FIGS. 4, 7 and 9, the oscillation limiting stopper 57 includes a box-shaped bracket 58 attached to the track frame 12 and defining vertical guides 58A, and a fixed bracket 59 supported by the tractor body 4 through the mounting frame 39 and having a roller 59A fitted in the guides 58A to roll therein. The fixed bracket 59 is detachably attached to a receiving bracket 59A bolted to the mounting frame 39.

Further, the oscillation limiting stopper 57 allows the same range for upward oscillation and downward oscillation, or a larger range for upward oscillation than for downward oscillation, with reference to a horizontal posture of the ground-engaging portion of endless crawler track 15 between the front and rear driven rolling elements 13 and 14. In the illustrated example, the front side can incline 8 degrees upward and 5 degrees downward.

The oscillation limiting stopper 57 may have the box-shaped bracket 58 attached to the mounting frame 39, and the fixed bracket 59 to the track frame 12. The roller 59A may be replaced with a slide shoe.

Referring to FIG. 3, a front wheel propelling transmission system 60 branches off from the rear differential drive shaft 34. The right and left front wheels 3 may be driven through a front differential 61 included in the transmission system 60.

The front wheel propelling transmission system 60 further includes a shift gear 62 mounted on the rear differential drive shaft 34 for meshing with a gear 63A mounted on a first transmission shaft 63.

A second transmission shaft 64 having gears 64A and 64B is disposed coaxial with the first transmission shaft 63. A clutch 65 is disposed between the first and second transmission shafts 63 and 64 for switching the front wheels 3 between driven state and non-driven state. A manual control device is provided for disengaging the clutch 65 to place the front wheels 3 in non-driven state when the tractor runs straight on the semicrawler units 10 (i.e. rear wheel drive mode with the front wheels idling), and engaging the clutch 65 to place the front wheels 3 in driven state when the tractor makes a turn (i.e. four wheel drive mode).

The manual control device is disposed adjacent the driver's seat. The control device is a shift lever when the clutch 65 is a shift gear as shown. When the clutch 65 is a hydraulic clutch, the control device is a control lever for operating an electromagnetic control valve which controls the clutch 65.

The front wheel propelling transmission system 60 further includes a propelling transmission mechanism 66 disposed between the second transmission shaft 64 and front differential drive shaft 61A. This transmission mechanism 66 is operable to drive the front wheels 3 at substantially the same peripheral speed as the drive rolling elements 11 of the semicrawler units 10.

That is, when the right and left rear wheels 9 are replaced with the right and left semicrawler units 10, the drive rolling elements 11 have approximately half the diameter of the rear wheels 9. If the rear wheel propelling transmission system 7 were used as it is, the drive rolling elements 11 would turn at approximately half the peripheral speed of the rear wheels 9. If driven under such condition, the front wheels 3 would wear quickly.

When the rear wheels 9 are replaced with the semicrawler units 10 while using the rear wheel propelling system 7 as it is, the clutch 65 of the front wheel propelling system 60 is disengaged to place the front wheels 3 in non-driven state (idling), or the propelling transmission mechanism 66 is operated to approximately equalize the peripheral speeds of the drive rolling elements 11 and front wheels 3.

In the embodiment shown in FIG. 3, a first hydraulic clutch 67 and a second hydraulic clutch 68 are arranged fore and aft on or coaxially with the front differential drive shaft 61A. The first hydraulic clutch 67 has a gear 67A meshed with a first gear 64A on the second transmission shaft 64. The second hydraulic clutch 68 has a gear 68A meshed with a second gear 64B on the second transmission shaft 64. The gears 64A and 67A have a gear ratio set to a reduction ratio for approximately equalizing the peripheral speeds of the drive rolling elements 11 of the semicrawler units and the front wheels 3. The gears 64B and 68A have a gear ratio for driving the front wheels 3 at the same speed as or faster than the rear wheels 9.

Thus, when the semicrawler units 10 are used, the first hydraulic clutch 67 is engaged to drive the front wheels 3 substantially at the same speed as the semicrawler units 10.

The front wheels 3 are placed in non-driven state by disengaging both the first and second hydraulic clutches 67 and 68. Thus, the clutches 67 and 68 act as a clutch device for switching between four wheel drive and rear wheel drive.

Figure 11:
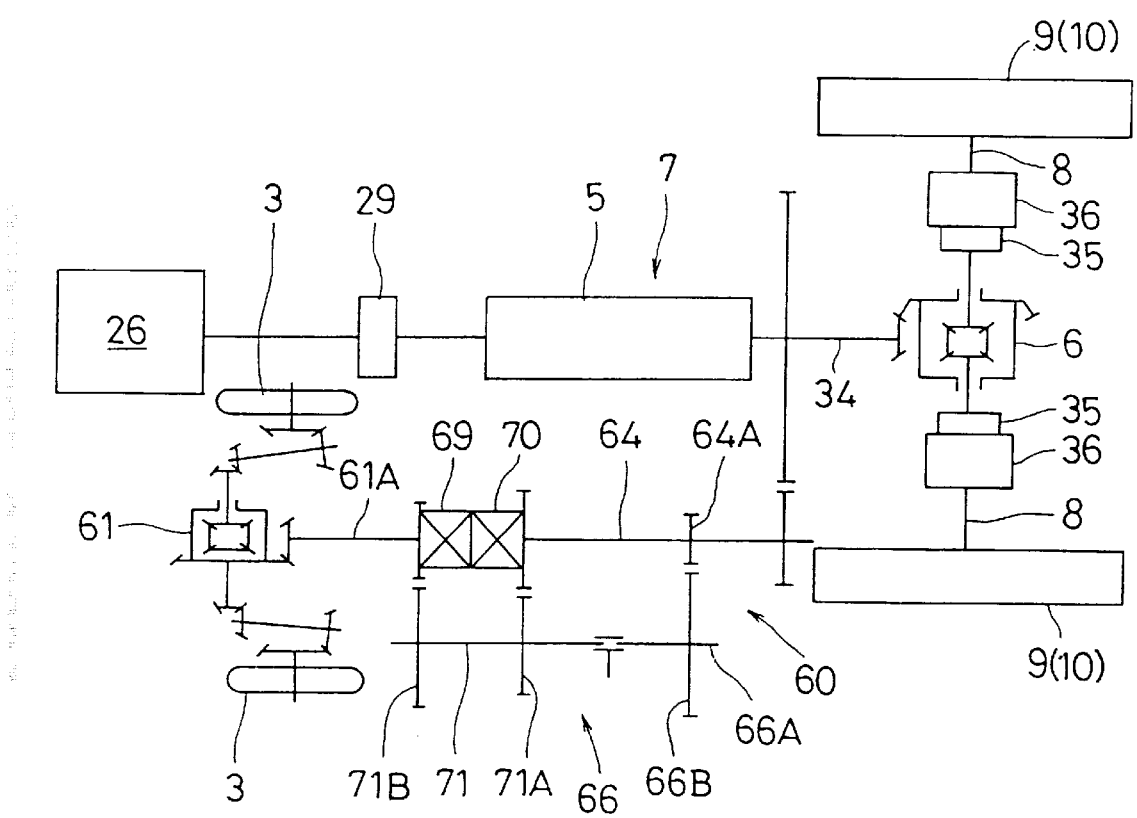
FIG. 11 is a schematic view of a propelling transmission system in a second embodiment of this invention.
Figure 12:
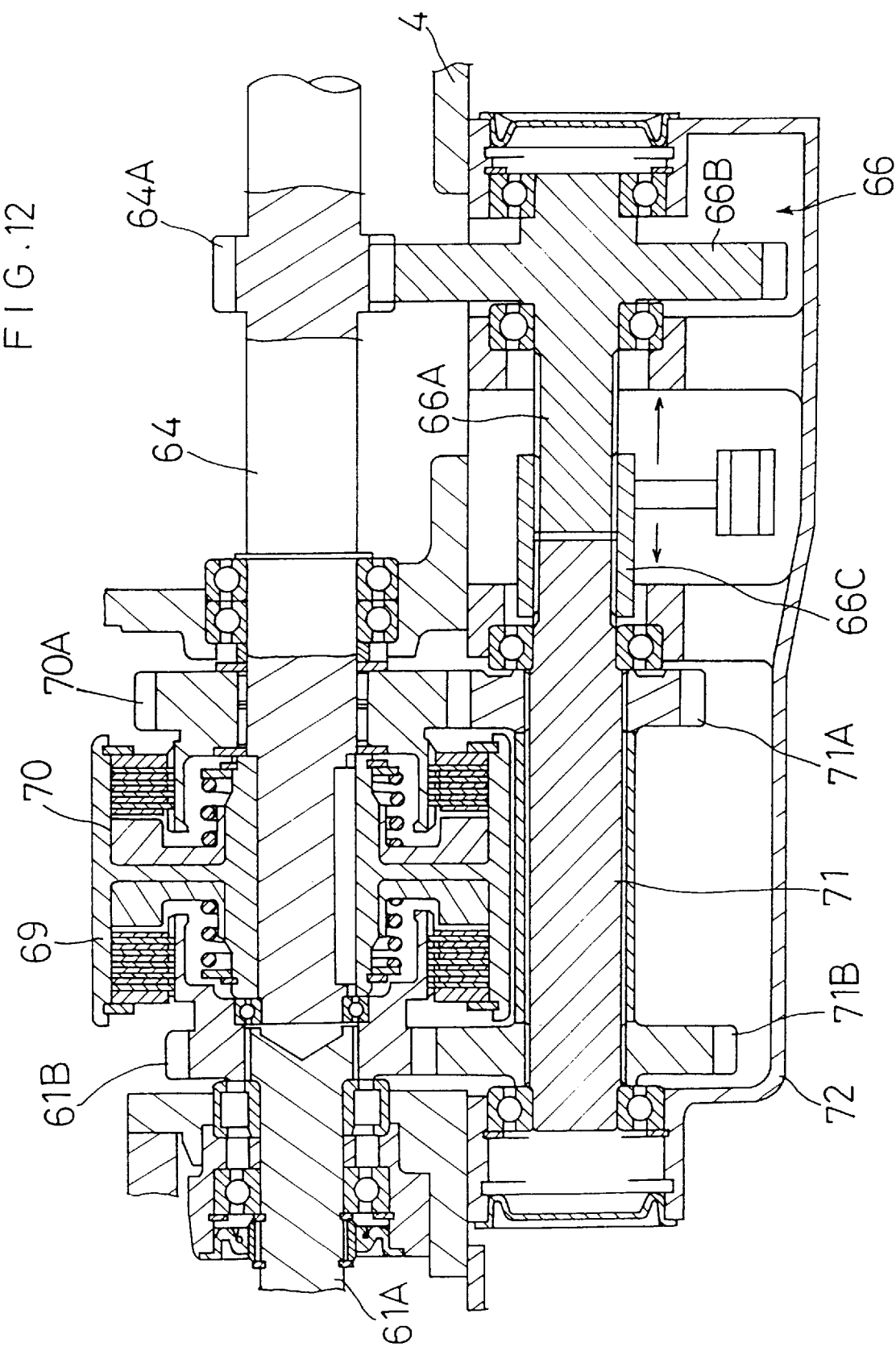
FIG. 12 is an enlarged fragmentary view of the construction shown in FIG. 11.
Figure 13:
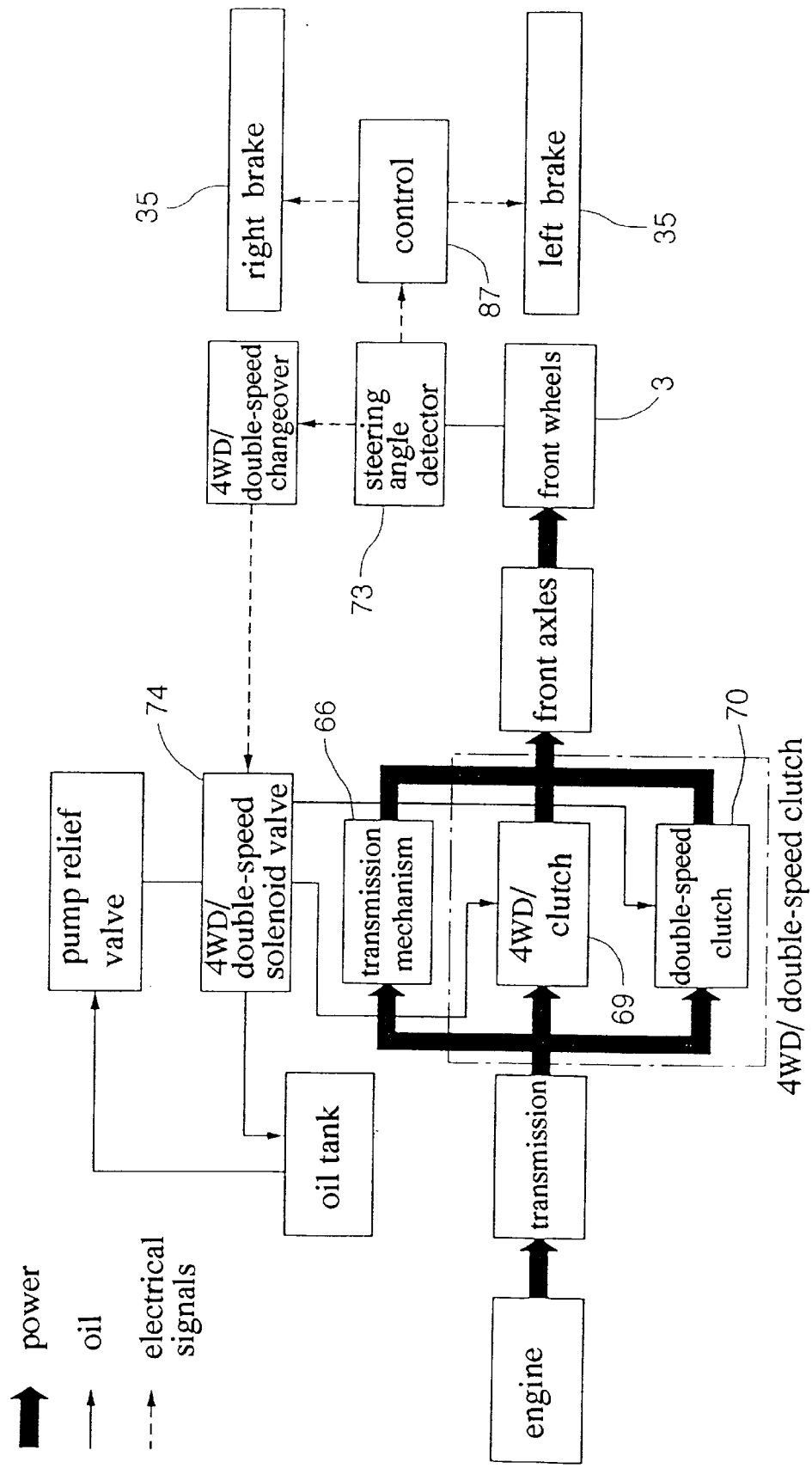
FIG. 13 is a block diagram of a construction for switching between 4WD and double-speed turn.

FIGS. 11 through 13 show a propelling transmission mechanism 66 in a second embodiment for driving the semicrawler units 10 and front wheels 3 at approximately the same peripheral speed. The transmission shaft 64 and differential drive shaft 61A of the front wheel propelling transmission system 60 have, arranged thereon, a hydraulically operable 4WD clutch (four wheel drive clutch) 69 and a hydraulically operable double-speed clutch (for driving the front wheels at approximately 1.6 times the speed of the rear wheels) 70. A double-speed shaft 71 is disposed below these clutches, which is mounted in a cassette case 72 detachably attached to a lower position of the tractor body 4. The double-speed shaft 71 has gears 71A and 71B arranged thereon. The gear 71A is meshed with a gear 70A freely rotatably mounted on the transmission shaft 64. The gear 71B is meshed with a gear 61B fixed to the differential drive shaft 61A. The cassette case 72 also supports a transmission shaft 66A of the propelling transmission mechanism 66 disposed coaxially with the double-speed shaft 71.

Further, the transmission shaft 64 has, mounted thereon, an input gear 64A of the propelling transmission mechanism 66. The input gear 64A is meshed with a gear 66B mounted on the transmission shaft 66A. The transmission shaft 66A and double-speed shaft 71 are connectable to each other through a clutch 66C in the form of a shifter.

In the second embodiment, when the rear wheels 9 are replaced with the semicrawler units 10, the clutch 66C is engaged whereby power is transmitted to the front differential drive shaft 61A through the gears 64A and 66B, double-speed shaft 71, and gears 71B and 61B. The propelling transmission mechanism 66 of the front wheel propelling transmission system 60 reduces the power to drive the front wheel 3 at approximately the same peripheral speed as the drive rolling elements 11.

The second embodiment is operable as shown in FIG. 13 when the rear wheels 9 are attached to the rear axles 8.

When the steering wheel is turned to steer the front wheels 3 by about 34° or more, a steering angle detecting switch 73 mounted in a left position of a front wheel case support is turned on, and a 4WD/double-speed solenoid valve 74 is operated to a double-speed position to engage the double-speed clutch 70. As a result, the front wheels are driven at approximately 1.6 times the speed of the rear wheels.

A 4WD/double-speed changeover switch 75 is provided for selecting a type of power transmission to the front wheels, i.e. "4WD OFF", "4WD ON" or "double-speed". This switch may be set to a "double-speed" position for causing the tractor to make a double-speed turn. When the switch is set to "4WD ON" or "4WD OFF", the solenoid valve 74 operates the 4WD hydraulic clutch 69 integral with the double-speed hydraulic clutch 70 to establish or cancel the four wheel drive mode.

Figure 14:
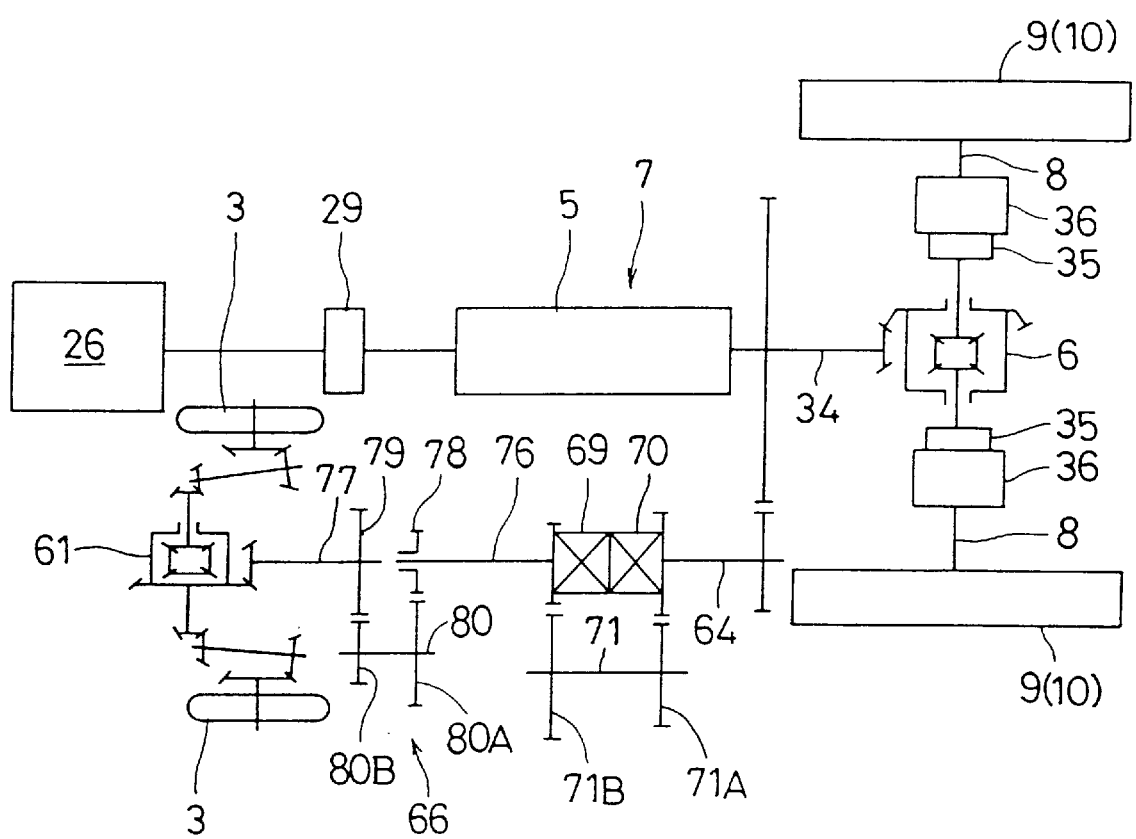
FIG. 14 is a schematic view of a propelling transmission system in a third embodiment of this invention.
Figure 15:
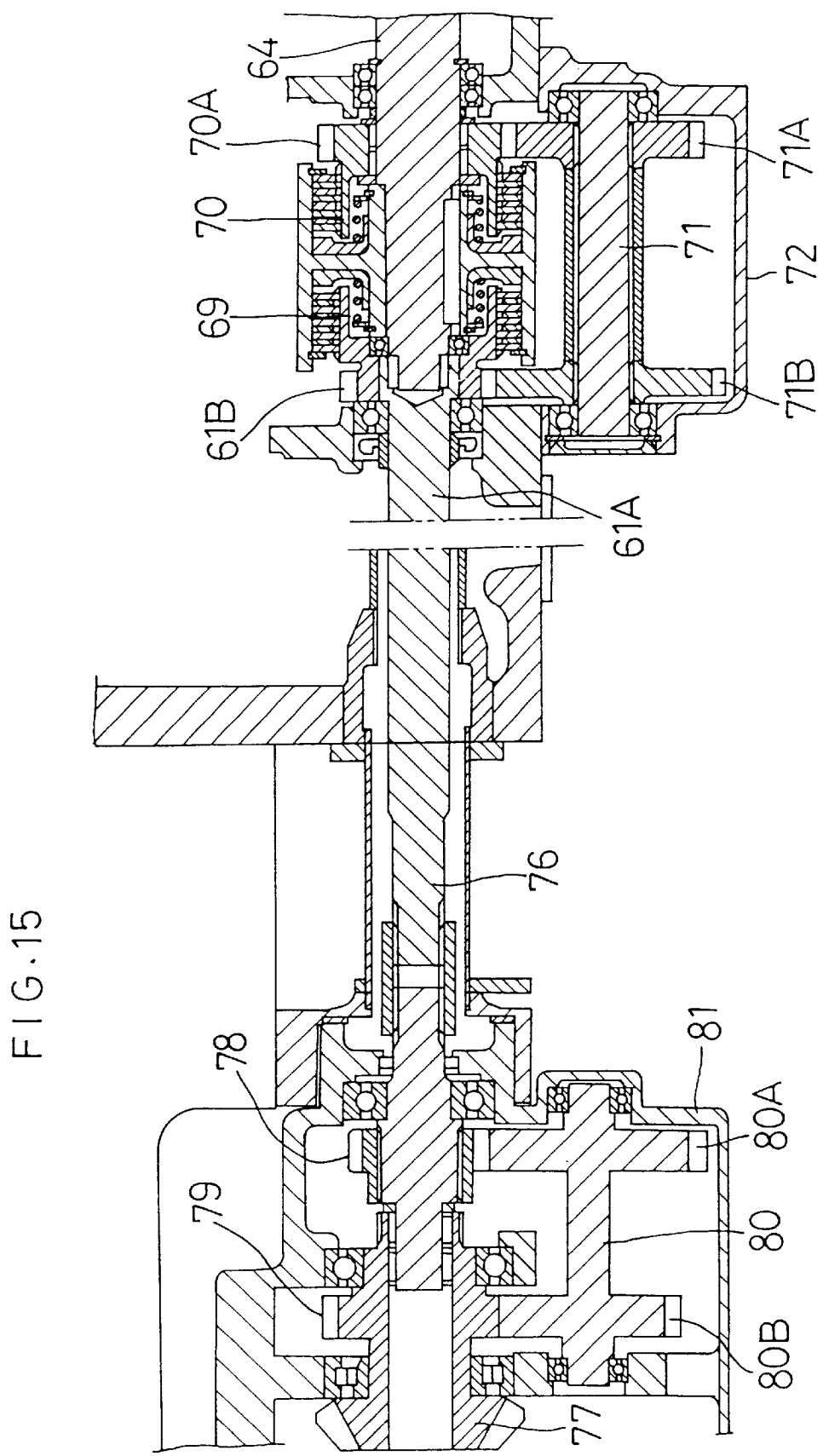
FIG. 15 is an enlarged fragmentary view of the construction shown in FIG. 14.

FIGS. 14 and 15 show a propelling transmission mechanism 66 in a third embodiment. The front differential drive shaft (or a front wheel propeller shaft interlocked thereto) comprises a first and a second shafts 76 and 77. The first shaft 76 has a shift gear 78 mounted thereon to be slidable through splines or the like for coupling and uncoupling the first and second shafts 76 and 77. A transmission shaft 80 mounted in a case 81 has gears 80A and 80B meshed with gears 78 and 79 mounted on the first and second shafts 76 and 77, respectively. When the rear wheels 9 are replaced with the semicrawler units 10, the shift gear 78 is disengaged to decelerate the front differential 61 through the gears 78, 80A, 80B and 79. Consequently, the front wheels 3 are driven at approximately the same peripheral speed as the drive rolling elements 11 of the semicrawler units 10. When the rear wheels 9 are attached, the first and second shafts 76 and 77 are directly coupled through the shift gear 78.

In the third embodiment, a double-speed turn as shown in FIGS. 12 and so on is achieved by the construction shown in FIG. 15.

Figure 16:
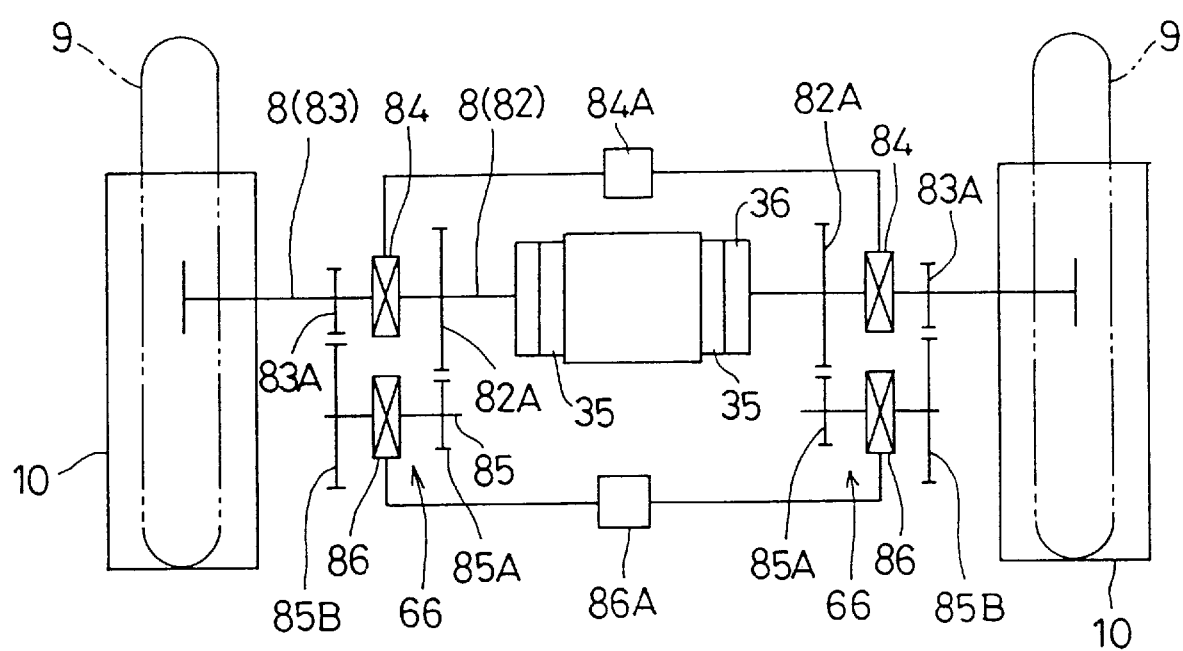
FIG. 16 is a schematic rear view of a propelling transmission system in a fourth embodiment of this invention.

FIG. 16 shows a propelling transmission mechanism 66 in a fourth embodiment. The rear wheel propelling transmission system 7 is adapted switchable to accelerate the drive rolling elements 11 of the semicrawler units 10.

In FIG. 16, each of the right and left rear axles 8 is divided into a first and a second shafts 82 and 83. The two shafts 82 and 83 are coupled and uncoupled through a first hydraulic clutch 84 operable by a valve 84A. On the other hand, an accelerating auxiliary shaft 85 has a second hydraulic clutch 86 operable by a valve 86A. Further, the auxiliary shaft 85 has gears 85A and 85B meshed with gears 82A and 83A mounted on the first and second shafts 82 and 83, respectively.

In the fourth embodiment, when the rear wheels 9 are replaced with the semicrawler units 10, the first hydraulic clutches 84 are disengaged and the second hydraulic clutches 86 are engaged. The right and left rear axles, i.e. the second shafts 83, are thereby accelerated through the gears 82A, 85A, 85B and 83A. Consequently, the drive rolling elements 11 are driven at approximately the same peripheral speed as the front wheels 3. When the rear wheels 9 are attached, the second hydraulic clutches 86 are disengaged, and the first hydraulic clutches 84 are engaged to couple the first and second shafts 82 and 83 directly.

Preferably, the propelling transmission mechanism 66 in the fourth embodiment is detachably attached to an upper or lower surface of the rear axle case 37.

The constructions shown in FIGS. 3 and 11 through 16, preferably, include a detecting switch 73 for detecting a steering angle of the right and left front wheels 3, and hydraulic brakes 35 for simultaneously or independently controlling the right and left semicrawler units 10 as shown in FIG. 13. A controller 87 may be provided which is operable, in response to a detection signal outputted from the switch 73 upon detection of a steering angle of the front wheels 3 exceeding a predetermined angle, to actuate the brake 35 of an inward one of the semicrawler units 10 making a turn. Thus, the tractor, even when traveling on the semicrawler units, can make a small, sharp turn. Preferably, the right and left front wheels 3 are accelerated when the tractor makes a turn.

As described hereinbefore, the tractor according to this invention has right and left front wheels steerable by a steering wheel and driven by a front wheel propelling transmission system. The tractor includes right and left rear axles driven by a rear wheel propelling transmission system having a change speed device and a rear differential mounted in a tractor body. Right and left rear wheels and right and left semicrawler units are interchangeably attached to the right and left rear axles. When the semicrawler units are attached, a propelling transmission mechanism drives the front wheels at approximately the same peripheral speed as drive rolling elements of the semicrawler units. The propelling transmission mechanism may be a reduction device included the front wheel propelling transmission system to be switchable to decelerate the front wheels. Alternatively, the propelling transmission mechanism may be a reduction device included in the rear wheel propelling transmission system to be switchable to accelerate the drive rolling elements of the semicrawler units.

Further, the front wheel propelling transmission system includes the clutch set 69 and 70 for switching the front wheels between driven state and non-driven state. When the tractor travels straight on the semicrawler units, the clutch set 69 and 70 is disengaged to place the front wheels in non-driven state. When the tractor makes a turn, the clutch set 69 and 70 is engaged to place the front wheels in driven state. A manual control device is provided to operate the clutch set 69 and 70 in this way. Further, a steering angle detector is provided for detecting a steering angle of the front wheels, along with a pair of brakes for independently braking the right and left semicrawler units. When the steering angle detector detects a steering angle of the front wheels exceeding a predetermined angle, a controller actuates the brake of an inward one of the semicrawler units making a turn. Preferably, the right and left front wheels are accelerated when the tractor makes a turn. It is preferable also that the propelling transmission mechanism is removably mounted.

As described in detail hereinbefore, in the tractor according to this invention, the right and left semicrawler units used in place of the rear wheels have track frames not fixed to the tractor body but supported to be oscillatable relative thereto. Thus, the semicrawler type tractor undergoes little pitching and has a low ground contact pressure during a run. These features assure an improved performance in wet fields, stability of operating posture, and an improved finishing precision.

What is claimed is:

1. A working vehicle comprising:
   a body frame;
   front wheels;
   propelling drive shafts disposed in a rear portion of said body frame; and
   semicrawler units receiving drive from said propelling drive shafts, respectively, each of said semicrawler units including:
   a drive rolling element attached to one of said propelling drive shafts;
   an endless crawler track driven by said drive rolling element and contacting a ground;

driven rolling elements engaged by said endless crawler track; and a track frame supporting said driven rolling elements, said driven rolling elements distributed in a forward end and a rearward end of said track frame, said track frame pivotally connected to a pivot shaft extending from one of said track frame and said body frame, wherein said track frame and said driven rolling elements remain at a fixed distance from said pivot shaft during operation of said working vehicle.

2. A working vehicle as defined in claim 1, wherein each of said semicrawler units further includes a stopper for limiting vertical oscillation of said track frame to a predetermined oscillating angle.

3. A working vehicle as defined in claim 2, wherein said stopper is set to equalize an upward permissible oscillating angle and a downward permissible oscillating angle from a horizontal reference position of said track frame.

4. A working vehicle as defined in claim 2, wherein said stopper is set to provide an upward permissible oscillating angle larger than a downward permissible oscillating angle from a horizontal reference position of said track frame.

5. A working vehicle as defined in claim 1, wherein said pivot shaft is disposed at a lower level above the ground than said propelling drive shafts.

6. A working vehicle as defined in claim 1, wherein said endless crawler track has a ground contacting length divided by a vertical line passing through an axis of said drive rolling element, into a longer forward portion and a shorter rearward portion.

7. A working vehicle as defined in claim 1, wherein said driven rolling elements are distributed to said forward end and said rearward end of said track frame to produce a linear ground-engaging portion of said endless crawler track, said endless crawler track including a forwardly and downwardly inclined portion extending from said drive rolling element to one of said driven rolling elements disposed at said forward end, and wherein said working vehicle further includes boarding steps provided above said inclined portion, said boarding steps positioned adjacent a cab positioned adjacent said body frame.

8. A working vehicle as defined in claim 1, wherein said driven rolling elements are displaceable relative to said track frame, and pressed against said endless crawler track by a biasing mechanism.

9. A working vehicle as defined in claim 1, wherein each said propelling drive shaft is supported to said track frame by a support arm.

10. A working vehicle as defined in claim 1, wherein each said support arm is pivotable with respect to at least one of said respective propelling drive shaft and said track frame.

11. A working vehicle as defined in claim 1, further comprising:
rear wheels interchangeable with said semicrawler units attachable to said propelling drive shafts; and
a propelling transmission means transmitting a driving force from an engine of said working vehicle to said front wheels and to said rear wheels with peripheral speeds of said rear wheels and said front wheels substantially equal when said rear wheels are attached to said propelling drive shafts, and transmitting said driving force from said engine to said front wheels and to said rear wheels with peripheral speeds of said drive rolling elements and said front wheels substantially equal when said semicrawler units are attached to said propelling drive shafts.

12. A working vehicle comprising:

a body frame;

front wheels;

propelling drive shafts disposed in a rear portion of said body frame; and semicrawler units receiving drive from said propelling drive shafts, respectively, each said semicrawler units including:

a drive rolling element attached to one of said propelling drive shafts;

an endless crawler track driven by said drive rolling elements and contacting a ground;

driven rolling elements engaged by said endless crawler track; and a track frame supporting said driven rolling elements, said track frame pivotally connected to a pivot shaft extending from said body frame, wherein said track frame remains at a fixed distance from said pivot shaft during operation of said working vehicle, wherein said track frame is supported by said body frame through a rectangular mounting frame fixed to said body frame, said pivot shaft provided to said mounting frame.

13. A working vehicle comprising:

a body frame;

front wheels;

propelling drive shafts disposed in a rear portion of said body frame;

semicrawler units receiving drive from said propelling drive shafts, respectively, each of said semicrawler units including a drive rolling element attached to one of said propelling drive shafts, an endless crawler track driven by said drive rolling element and contacting a ground, driven rolling elements engaged by said endless crawler track, a track frame supporting said driven rolling elements, said driven rolling elements distributed to a forward end and a rearward end of said track frame, said track frame pivotally connected to a pivot shaft extending from one of said track frame and said body frame, wherein said track frame and said driven rolling elements remain at a fixed distance from said pivot shaft during operation of said working vehicle; and rear wheels interchangeable with said semicrawler units for attachment to said propelling drive shafts.

14. A working vehicle comprising:

a body frame;

front wheels;

propelling drive shafts disposed in a rear portion of said body frame; and semicrawler units receiving drive from said propelling drive shafts, respectively, each of said semicrawler units including:

a drive rolling element attached to one of said propelling drive shafts;

an endless crawler track driven by said drive rolling elements and contacting a ground;

driven rolling elements engaged by said endless crawler track;

a track frame supporting said driven rolling elements, said track frame pivotally connected to a pivot shaft extending from one of said track frame and said body frame, wherein said body frame remains at a fixed distance from said pivot shaft during operation of said working vehicle; and a stopper for limiting vertical oscillation of said track frame to a predetermined oscillating angle, wherein said stopper includes a first bracket attached to said track frame and defining a vertical guide and a second bracket attached to said body frame, said second bracket having a roller positioned in said vertical guide.

15. A working vehicle comprising:

a body frame;

front wheels;

propelling drive shafts disposed in a rear portion of said body frame; and semicrawler units receiving drive from said propelling drive shafts, respectively, each of said semicrawler units including:

a drive rolling element attached to one of said propelling drive shafts;

an endless crawler track driven by said drive rolling elements and contacting a ground;

driven rolling elements engaged by said endless crawler track;

a track frame supporting said driven rolling elements, said track frame pivotally connected to a pivot shaft extending from one of said track frame and said body frame, wherein said body frame remains at a fixed distance from said pivot shaft during operation of said working vehicle; and a stopper for limiting vertical oscillation of said track frame to a predetermined oscillating angle, wherein said stopper includes:

a first bracket attached to one of said body frame and said track frame, said bracket defining a vertical guide defining an upper limit and a lower limit; and a second bracket attached to the other of said body frame and said track frame, said second bracket having a horizontal member positioned in said vertical guide.

16. A working vehicle comprising:

a body frame;

front wheels;

propelling drive shafts disposed in a rear portion of said body frame; and semicrawler units receiving drive from said propelling drive shafts, respectively, each of said semicrawler units including a drive rolling element attached to one of said propelling drive shafts, an endless crawler track driven by said drive rolling element and contacting a ground, driven rolling elements engaged by said endless crawler track, and a track frame supporting said driven rolling elements at a forward end and a rearward end thereof, said track frame being supported by said body frame to be pivotable through and about a pivot shaft wherein said pivot shaft is provided between said track frame and said body frame such that said pivot shaft cannot move linearly with respect to said track frame and said body frame.

17. A working vehicle comprising:

a body frame;

front wheels;

propelling drive shafts disposed in a rear portion of said body frame; and semicrawler units receiving drive from said propelling drive shafts, respectively, each of said semicrawler units including a drive rolling element attached to one of said propelling drive shafts, an endless crawler track driven by said drive rolling element and contacting a ground, a driven rolling element engaged by said endless crawler track; and a track frame supporting said driven rolling elements at a forward end and a rearward end thereof, said track frame being supported by said body frame to be pivotable through and about a pivot shaft wherein said pivot shaft is provided between said track frame and said body frame such that said track frame cannot move linearly with respect to said pivot shaft and said body frame.

18. A working vehicle comprising:

a body frame;

front wheels;

propelling drive shafts disposed in a rear portion of said body frame; and semicrawler units receiving drive from said propelling drive shafts, respectively, each of said semicrawler units including:

a drive rolling element attached to one of said propelling drive shafts;

an endless crawler track driven by said drive rolling element and contacting a ground;

driven rolling elements engaged by said endless crawler track; and a track frame supporting said driven rolling elements, said track frame pivotally connected to a pivot shaft extending from one of said track frame and said body frame, wherein a distance between said pivot shaft and a center axis of said drive rolling element is less than a radius of said drive rolling element.

* * * * *

UNITED STATES PATENT AND TRADEMARK OFFICE
CERTIFICATE OF CORRECTION

PATENT NO. : 6,199,646 B1
DATED : March 13, 2001
INVENTOR(S) : Yoshifumi Tani et al.

It is certified that error appears in the above-identified patent and that said Letters Patent is hereby corrected as shown below:

<u>Title page, item [56],</u>
References Cited, insert:

-- OTHER DOCUMENTS
Translation of "Agricultural Machine Handbook, New Edition," Tokyo, Japan (1984) pp 257-259. --

Signed and Sealed this

Thirtieth Day of October, 2001

Attest:

NICHOLAS P. GODICI
Attesting Officer     Acting Director of the United States Patent and Trademark Office